(12) United States Patent
Zhou et al.

(10) Patent No.: US 10,933,931 B2
(45) Date of Patent: Mar. 2, 2021

(54) IMAGE PROCESSING METHOD AND SYSTEM, STORAGE MEDIUM AND MOVING SYSTEM

(71) Applicant: BOE TECHNOLOGY GROUP CO., LTD., Beijing (CN)

(72) Inventors: Li Zhou, Beijing (CN); Xuan He, Beijing (CN); Kailiang Zhang, Beijing (CN); Jingang Kang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 144 days.

(21) Appl. No.: 16/085,652

(22) PCT Filed: Feb. 2, 2018

(86) PCT No.: PCT/CN2018/075057
§ 371 (c)(1),
(2) Date: Sep. 17, 2018

(87) PCT Pub. No.: WO2019/000947
PCT Pub. Date: Jan. 3, 2019

(65) Prior Publication Data
US 2019/0256159 A1  Aug. 22, 2019

(30) Foreign Application Priority Data
Jun. 30, 2017  (CN) .......................... 201710554504.1

(51) Int. Cl.
*B62D 57/024* (2006.01)
*G06T 7/55* (2017.01)
(Continued)

(52) U.S. Cl.
CPC ............ *B62D 57/024* (2013.01); *B25J 5/007* (2013.01); *B25J 19/021* (2013.01);
(Continued)

(58) Field of Classification Search
CPC ......... B62D 57/024; G06T 7/55; G06T 7/521; G06T 7/13; G06T 7/00; G06T 5/002;
(Continued)

(56) References Cited

U.S. PATENT DOCUMENTS

2006/0245653 A1* 11/2006 Camus ................. G06K 9/3241
382/199
2013/0129224 A1* 5/2013 Katz .................. G06K 9/00201
382/199

* cited by examiner

*Primary Examiner* — Jianxun Yang
(74) *Attorney, Agent, or Firm* — Dilworth & Barrese, LLP.; Michael J. Musella, Esq.

(57) ABSTRACT

An image processing method and system, a storage medium and a moving system are provided, and the image processing method includes: obtaining a 2D depth array $D_p$ having depth information of a target object; calculating to obtain a depth vector $D=[d_1, d_2, d_3, \ldots, d_i, \ldots, d_n]$, in which an element $d_i$ is an average value of elements of the $i^{th}$ row in the 2D depth array; calculating to obtain an edge determination vector $\Delta D=[\Delta d_1, \Delta d_2, \Delta d_3, \ldots, \Delta d_i, \ldots, \Delta d_{n-1}]$, in which an element $\Delta d_i=|d_i-d_{i+1}|$; calculating an average value $d_0=(|\Delta d_2-\Delta d_1|+|\Delta d_3-\Delta d_2|+ \ldots +|\Delta d_{n-1}-\Delta d_{n-2}|)/(n-2)$; and comparing an absolute value $|\Delta d_i-\Delta d_{i+1}|$ with $d_0$ to identify an edge of the target object, in which in a situation where $|\Delta d_i-\Delta d_{i+1}|$ is greater than $d_0$, it is determined that the elements of the $i^{th}$ row in the 2D depth array $D_p$ correspond to the edge of the target object.

19 Claims, 4 Drawing Sheets (51) Int. Cl.
*G06T 7/521* (2017.01)
*G06T 7/13* (2017.01)
*B25J 5/00* (2006.01)
*B25J 19/02* (2006.01)
*E01D 19/10* (2006.01)
*G06T 7/00* (2017.01)
*H04N 13/00* (2018.01)

(52) U.S. Cl.
CPC .............. *E01D 19/106* (2013.01); *G06T 7/00* (2013.01); *G06T 7/13* (2017.01); *G06T 7/521* (2017.01); *G06T 7/55* (2017.01); *H04N 13/00* (2013.01)

(58) Field of Classification Search
CPC ............. G06T 2207/10028; B25J 5/007; B25J 19/021; E01D 19/106; H04N 13/00; G06K 9/00201; G06K 9/00375; G06K 9/3241; G06K 2209/23; G06K 9/00805
See application file for complete search history.

IMAGE PROCESSING METHOD AND SYSTEM, STORAGE MEDIUM AND MOVING SYSTEM

TECHNICAL FIELD

Embodiments of the present disclosure relate to an image processing method, an image processing system, a storage medium, a moving system including the image processing system, and a moving system matching with the image processing system.

BACKGROUND

A climbing robot may implement functions such as helping the disabled and the old to go up and down stairs or moving heavy objects on stairs.

A wheel climbing robot is a common type climbing robot. However, common wheel climbing robots such as those moving with one single wheel have fixed step size and fixed climbing height and can not identify automatically different stair heights or widths. Therefore, the climbing function and the turning at corner function can only be implemented with manual assistance.

SUMMARY

Embodiments of the present disclosure provide an image processing method, an image processing system, a storage medium, a moving system including the image processing system and a moving system matching with the image processing system, and can identify step-like structures such as stairs automatically.

At least one embodiment of the present disclosure provides an image processing method including: obtaining a 2D (two-dimensional) depth array $D_p$ having depth information of a target object, wherein an element $d_{ij}$ is an element of an $i^{th}$ row and $j^{th}$ column in the 2D depth array $D_p$ and a value of the element $d_{ij}$ is a depth value; calculating an average value of elements in each row in the 2D depth array $D_p$ to obtain a depth vector $D=[d_1, d_2, d_3, \ldots, d_i, \ldots, d_n]$, wherein an element $d_i$ is an average value of elements of the $i^{th}$ row in the 2D depth array; calculating an absolute value of differences between adjacent elements in the depth vector D to obtain an edge determination vector $\Delta D=[\Delta d_1, \Delta d_2, \Delta d_3, \ldots, \Delta d_i, \ldots, \Delta d_{n-1}]$, wherein an element $\Delta d_i=|d_i-d_{i+1}|$; calculating an average value $d_0$ of absolute values of differences between adjacent elements in the edge determination vector $\Delta D$, wherein $d_0=(|\Delta d_2-\Delta d_1|+|\Delta d_3-\Delta d_2|+ \ldots +|\Delta d_{n-1}-\Delta d_{n-2}|)/(n-2)$; and comparing an absolute value $|\Delta d_i-\Delta d_{i+1}|$ of differences between adjacent elements in the edge determination vector $\Delta D$ with $d_0$ to identify an edge of the target object, wherein in a situation where $|\Delta d_i-\Delta d_{i+1}|$ is greater than $d_0$, it is determined that the elements of the $i^{th}$ row in the 2D depth array $D_p$ correspond to the edge of the target object.

For example, in the situation where $|\Delta d_i-\Delta d_{i+1}|$ is greater than $d_0$, a value of $d_i$ in the depth vector D is determined as a distance d from the edge to a line connecting optical centers of a left pick-up head and a right pick-up head that a camera for obtaining the depth information of the target object includes.

For example, the image processing further includes: determining a horizontal distance from the edge to the line connecting the optical centers and a vertical distance from the edge to the line connecting the optical centers according to a rotation angle θ of the camera with respect to a horizontal plane while acquiring a left image and a right image which are used for obtaining the 2D depth array and according to the distance d from the edge to the line connecting the optical centers.

For example, the image processing further includes: step A of capturing the target object with a camera at different rotation angles with respect to a horizontal plane to obtain a plurality of sets of left images and right images; step B of obtaining a plurality of 2D depth arrays according to the plurality of sets of left images and right images; step C of determining a number of edges corresponding to each 2D depth array; step D of determining rotation angles $\theta_0$ and $\theta_1$ of the camera with respect to the horizontal plane that the 2D depth arrays respectively corresponding to 0 edge and 1 edge correspond to, respectively; and repeating steps A to C within an angle range of $\theta_0$ to $\theta_1$ to determine a critical rotation angle $\theta_c$ of the camera with respect to the horizontal plane, wherein the critical rotation angle $\theta_c$ refers to a rotation angle corresponding to the 2D depth array which corresponds to 1 edge and serves as a critical change point while the number of edges corresponding to the 2D depth array changes between 0 and 1.

For example, the image processing method further includes: calculating a horizontal distance and a vertical distance between adjacent edges according to the critical rotation angle $\theta_c$.

For example, the image processing method further includes: before obtaining the 2D depth array $D_p$, obtaining a left image and a right image which include the target object with a left pick-up head and a right pick-up head of a camera respectively; and comparing at least one of the left image and the right image with a reference image to determine whether the target object in the at least one of the left image and the right image includes a straight line edge.

For example, the image processing method further includes: after determining that the target object in the at least one of the left image and the right image includes the straight line edge, acquiring a plurality of sets of corresponding pixel points from the left image and the right image, wherein each set of corresponding pixel points includes a left pixel point in the left image and a right pixel point in the right image which correspond to a same object point of the target object; and comparing magnitudes of ordinates of the left pixel point and the right pixel point of each set of corresponding pixel points to determine whether the straight line edge of the target object is parallel to the line connecting optical centers of the left pick-up head and the right pick-up head.

For example, in a situation where the ordinate of the left pixel point equals to the ordinate of the right pixel point for the set of corresponding pixel points, it is determined that the straight line edge is parallel to the line connecting the optical centers of the left pick-up head and the right pick-up head; in a situation where the ordinate of the left pixel point is greater than the ordinate of the right pixel point for the set of corresponding pixel points, it is determined that a distance from the optical center of the left pick-up head to the straight line edge is greater than a distance from the optical center of the right pick-up head to the straight line edge; and in a situation where the ordinate of the left pixel point is smaller than the ordinate of the right pixel point for the set of corresponding pixel points, it is determined that the distance from the optical center of the left pick-up head to the straight line edge is smaller than the distance from the optical center of the right pick-up head to the straight line edge.

For example, the image processing method further includes: in a situation where the straight line edge is parallel to the line connecting the optical centers, obtaining a parallax array $D_x$ by utilizing the left image and the right image, wherein a value of each element of the parallax array $D_x$ is an absolute value of a difference between abscissas of a left pixel point and a right pixel point which are in a set of corresponding pixel points that the each element corresponds to; and obtaining the 2D depth array $D_p$ according to the parallax array $D_x$, a focal length f of the left pick-up head and the right pick-up head and a distance $D_c$ between the optical centers of the left pick-up head and the right pick-up head.

At least one embodiment of the present application provides an image processing system including a processor and a memory for storing an executable instruction that is loaded by the processor to execute: obtaining a 2D depth array $D_p$ having depth information of a target object, wherein an element $d_{ij}$ is an element of an $i^{th}$ row and $j^{th}$ column in the 2D depth array $D_p$ and a value of the element $d_{ij}$ is a depth value; calculating an average value of elements in each row in the 2D depth array $D_p$ to obtain a depth vector $D=[d_1, d_2, d_3, \ldots, d_i, \ldots, d_n]$, wherein an element $d_i$ is an average value of elements of the $i^{th}$ row in the 2D depth array; calculating an absolute value of differences between adjacent elements in the depth vector D to obtain an edge determination vector $\Delta D=[\Delta d_1, \Delta d_2, \Delta d_3, \ldots, \Delta d_i, \ldots, \Delta d_{n-1}]$, wherein an element $\Delta d_i=|d_i-d_{i+1}|$; calculating an average value $d_0$ of absolute values of differences between adjacent elements in the edge determination vector $\Delta D$, wherein $d_0=(|\Delta d_2-\Delta d_1|+|\Delta d_3-\Delta d_2|+ \ldots +|\Delta d_{n-1}-\Delta d_{n-2}|)/(n-2)$; and comparing an absolute value $|\Delta d_i-\Delta d_{i+1}|$ of differences between adjacent elements in the edge determination vector $\Delta D$ with $d_0$ to identify an edge of the target object, wherein in a situation where $|\Delta d_i-\Delta d_{i+1}|$ is greater than $d_0$, it is determined that the elements of the $i^{th}$ row in the 2D depth array $D_p$ correspond to the edge of the target object.

At least one embodiment of the present application provides a storage medium with an instruction stored therein, and the instruction is configured to be loaded by a processor to execute: obtaining a 2D depth array $D_p$ having depth information of a target object, wherein an element d, is an element of an $i^{th}$ row and $j^{th}$ column in the 2D depth array $D_p$ and a value of the element $d_{ij}$ is a depth value; calculating an average value of elements in each row in the 2D depth array $D_p$ to obtain a depth vector $D=[d_1, d_2, d_3, \ldots, d_i, \ldots, d_n]$, wherein an element $d_i$ is an average value of elements of the $i^{th}$ row in the 2D depth array; calculating an absolute value of differences between adjacent elements in the depth vector D to obtain an edge determination vector $\Delta D=[\Delta d_1, \Delta d_2, \Delta d_3, \ldots, \Delta d_i, \ldots, \Delta d_{n-1}]$, wherein an element $\Delta d_i=|d_i-d_{i+1}|$; calculating an average value $d_0$ of absolute values of differences between adjacent elements in the edge determination vector $\Delta D$, wherein $d_0=(|\Delta d_2-\Delta d_1|+|\Delta d_3-\Delta d_2|+ \ldots +|\Delta d_{n-1}-\Delta d_{n-2}|)/(n-2)$; and comparing an absolute value $|\Delta d_i-\Delta d_{i+1}|$ of differences between adjacent elements in the edge determination vector $\Delta D$ with $d_0$ to identify an edge of the target object, wherein in a situation where $|\Delta d_i-\Delta d_{i+1}|$ is greater than $d_0$, it is determined that the element of the $i^{th}$ row in the 2D depth array $D_p$ correspond to the edge of the target object.

At least one embodiment of the present application provides a moving system including the image processing system described above.

For example, the moving system further includes a camera and a movement control system. The camera includes a left pick-up head and a right pick-up head and is configured to output image signals to the image processing system. The movement control system includes: an active moving device configured to move the moving system; a passive moving device connected with the active moving device and configured to move under drive of the active moving device; a climbing device configured to drive the moving system to implement a climbing function; and a drive controller configured to control actions of the active moving device and the climbing device according to a processing result of the image processing system.

For example, the climbing device includes a climbing wheel which includes a plurality of rod-like structures extending radially and outwardly from a center of the climbing wheel.

For example, the climbing device further includes an up-and-down rod connected with the climbing wheel.

For example, the active moving device includes two drive moving wheels with equal diameters and a line connecting centers of the two drive moving elements is parallel to a line connecting optical centers of the left pick-up head and the right pick-up head of the camera.

For example, the drive controller includes a movement drive shaft, a climbing drive shaft, an engine and a brake, the engine is configured to drive the active moving device via the movement drive shaft and drive the climbing device via the climbing drive shaft, and the brake is configured to control braking of the active moving device and the passive moving device.

For example, the passive moving device includes a driven moving wheel, a half shaft and a differential mechanism, the differential mechanism is connected with the movement drive shaft, and the half shaft connects the driven moving wheel with the differential mechanism.

For example, the movement control system further includes a base plate, the camera is at a front end of the base plate, the active moving device, and the passive moving device and the climbing device are below the base plate.

At least one embodiment of the present disclosure provides a moving system matching with the image processing system described above and includes a camera and a movement control system. The camera includes a left pick-up head and a right pick-up head and is configured to output image signals to the image processing system. The movement control system includes: an active moving device configured to move the moving system; a passive moving device connected with the active moving device and configured to move under drive of the active moving device; a climbing device configured to drive the moving system to implement a climbing function, wherein the climbing device includes a climbing wheel which includes a plurality of rod-like structures extending radially and outwardly from a center of the climbing wheel; and a drive controller configured to control actions of the active moving device and the climbing device according to a processing result of the image processing system.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Embodiments of the present disclosure provide an image processing method, an image processing system, a storage medium, a moving system including the image processing system and a moving system matching with the image processing system. The image processing method or image processing system may be used to identify objects including steps such as stairs. The moving system adopting the image processing method or image processing system also has the similar automatic recognition function and may further be configured to have the automatic climbing function. For example, the moving system is a climbing robot or a leg system of a climbing robot.

The image processing method provided in the embodiments of the present disclosure will be described in detail below with reference to FIGS. 1-4.

Figure 1:
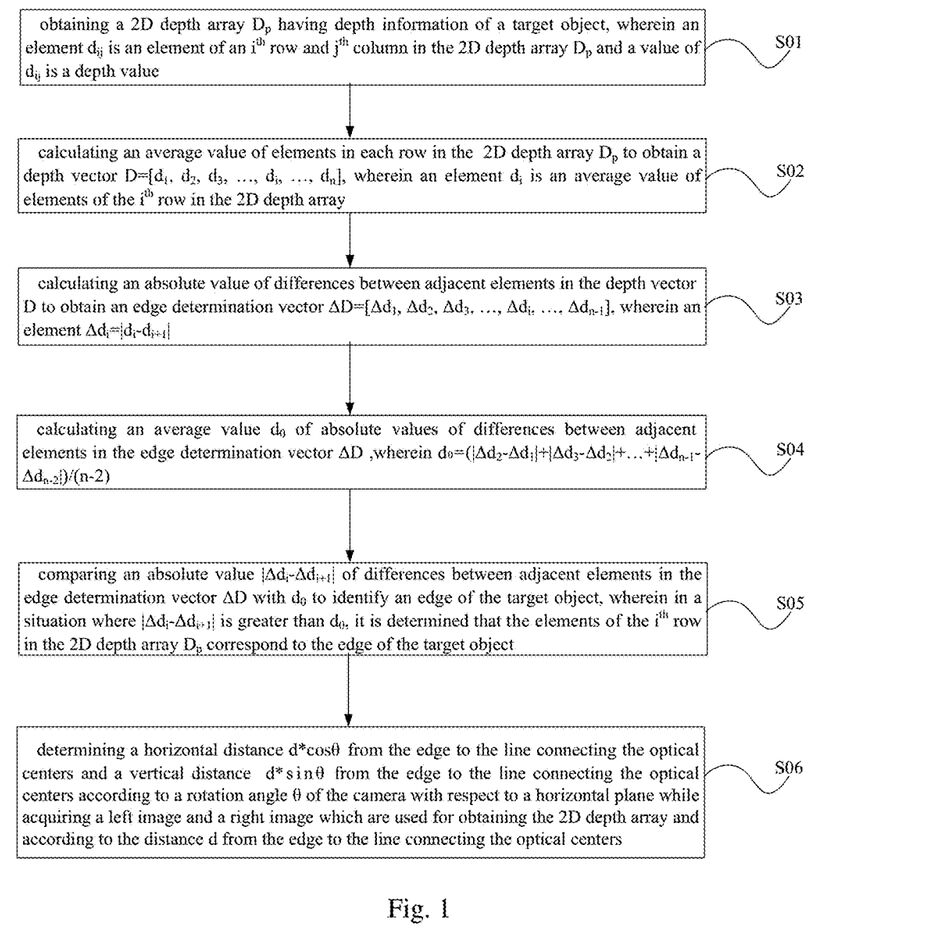
FIG. 1 is a flow chart of an image processing method provided in embodiments of the present disclosure.

At least one embodiment of the present disclosure provides an image processing method that may be used to identify straight line edges of step-like structures such as stairs. For example, as shown in FIG. 1, the method includes at least the following steps S01 to S05.

Step S01: acquiring a 2D (two-dimensional) depth array $D_p = [d_{11}, d_{12}, d_{13}, \ldots ; d_{21}, d_{22}, d_{23}, \ldots ; \ldots ; \ldots ; d_{n1}, d_{n2}, d_{n3}, \ldots]$ including the depth information of a target object such as a stair, in which an element $d_{ij}$ is the element of row i and column j in the 2D depth array $D_p$ and the value of $d_{ij}$ is the depth value which indicates the distance from the object point corresponding to the element to a camera.

It is to be noted that the depth value of an element refers to the distance from the object point corresponding to the element to the camera, namely the distance from the object point to the line connecting the optical centers of the left pick-up head and the right pick-up head of the camera.

Step S02: calculating the average value of elements in each row in the 2D depth array D, to obtain a depth vector $D = [d_1, d_2, d_3, \ldots, d_i, \ldots, d_n]$, in which an element $d_i$ is the average value of elements of the $i^{th}$ row in the 2D depth array. Assuming that there are m elements in the $i^{th}$ row, then $d_i = (d_{i1} + d_{i2} + d_{i3} + \ldots + d_{im})/m$.

Step S03: calculating the absolute value of the difference between adjacent elements in the depth vector D to obtain an edge determination vector $\Delta D = [\Delta d_1, \Delta d_2, \Delta d_3, \ldots, \Delta d_i, \ldots, \Delta d_{n-1}]$, in which an element $\Delta d_i = |d_i - d_{i+1}|$.

Step S04: calculating the average value $d_0$ of absolute values of differences between adjacent elements in the edge determination vector $\Delta D$, in which $d_0 = (|\Delta d_2 - \Delta d_1| + |\Delta d_3 - \Delta d_2| + \ldots + |\Delta d_{n-1} - \Delta d_{n-2}|)/(n-2)$.

Step S05: comparing an absolute value $|\Delta d_i - \Delta d_{i+1}|$ of differences between adjacent elements in the edge determination vector $\Delta D$ with $d_0$ to identify an edge of the target object, in which in a situation where $|\Delta d_i - \Delta d_{i+1}|$ is greater than $d_0$, it is determined that the $i^{th}$ row of elements in the 2D depth array $D_p$ correspond to the edge of the target object.

The image processing method provided in the embodiments of the present disclosure utilizes the following attributes of the step-like structures such as stairs, taking a stair as an example: (1) in a situation where the step-like stair appears in front of a camera and step edges of the stair are parallel to the line connecting the optical centers of the left pick-up head and the right pick-up head of the camera, the depth values from object points of the same step edge to the camera are the same, so it is possible to obtain the depth vector D by averaging elements of each row in the 2D depth array $D_p$ in step S02; and (2) near the step edge, the depth value experiences a sudden change with which it is possible to identify the location of sudden change by comparing the value of $|\Delta d_i - \Delta d_{i+1}|$ with the value of $d_0$ in step S05, so as to identify the location of the step edge.

For example, in step S05, in a situation where $|\Delta d_i - \Delta d_{i+1}|$ is greater than $d_0$, it is also possible to determine the value of $d_i$ in the depth vector D as the distance from the straight line edge to the camera for acquiring the depth information of the target object, that is, the distance d from the straight line edge to the line connecting the optical centers of the left pick-up head and the right pick-up head included in the camera.

For example, as shown in FIG. 1, the image processing method provided in at least one embodiment of the present disclosure further includes step S06: after identifying the straight line edge of the target object, determining a horizontal distance d*cos θ from the edge to the line connecting the optical centers and a vertical distance d*sin θ from the edge to the line connecting the optical centers, according to the rotation angle θ of the camera with respect to a horizontal plane while capturing the left image and the right image for acquiring the 2D depth array $D_p$ and according to the above-mentioned distance d from the edge to the line connecting the optical centers of the left pick-up head and the right pick-up head of the camera, and determining the linear movement distance and the up/down distance of the moving system according to the horizontal distance and the vertical distance, respectively.

For example, in capturing the target object to obtain the left image and the right image, it is possible to record the rotation angle θ of the camera with respect to the horizontal plane which is in favor of acquiring the rotation angle θ recorded upon capturing after identifying the straight line edge.

For example, the image processing method provided in at least one embodiment of the present disclosure may further include: step A of capturing, with the camera, the target object with different rotation angles with respect to the horizontal plane to obtain a plurality of sets of left images and right images; step B of acquiring a plurality of 2D depth arrays according to the plurality of sets of left images and right images; step C of determining the number of edges corresponding to each 2D depth array; and step D of determining the rotation angles $θ_0$ and $θ_1$ of the camera with respect to the horizontal plane that the 2D depth arrays respectively corresponding to 0 edge and 1 edge correspond to, respectively; and repeating step A to step C in the range of angle $θ_0$ to $θ_1$ to determine a critical rotation angle $θ_c$ of the camera with respect to the horizontal plane. The critical rotation angle $θ_c$ refers to a rotation angle corresponding to a 2D depth array which corresponds to 1 edge and serves as a critical change point while the number of edges corresponding to 2D depth arrays change between 0 and 1. Taking the camera below the stair as an example, as the rotation angle of the camera with respect to horizontal plane increases, the number of edges obtained according to 2D depth arrays respectively corresponding to different rotation angles increases from 0 gradually; there is a critical point at which the number of edges just becomes to 1 in the process that the number of edges gradually changes; and the 2D depth array that the critical point corresponds to is a critical 2D depth array and the rotation angle that the critical point corresponds to is the critical rotation angle $θ_c$.

For example, 2D depth arrays under different rotation angles can be obtained by adjusting the rotation angle of the camera (namely the angle between the camera and the horizontal plane) with a selected stepping angle (for example, an angle variation of 5°) in the initial angle range of α/2 to 45° with α being the view field angle of the camera; then an angle range with the number of edges (steps) between 1 and 0 can be selected after determining the number of edges that the 2D depth arrays respectively corresponding to different rotation angles corresponds to, respectively; and afterwards, depth vectors D at different rotation angles within the angle range can be further obtained until obtaining the rotation angle at which the number of edges just becomes 1, which is the critical rotation angle $θ_c$.

Figure 2:
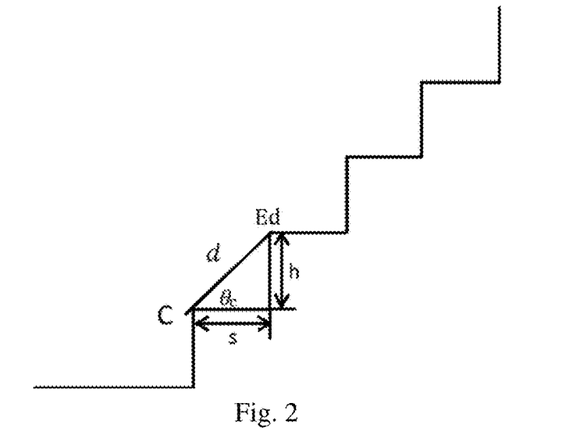
FIG. 2 is a schematic relationship diagram among a critical rotation angle of a camera, a width of a step and a height of the step in the embodiments of the present disclosure.

It is possible to determine the width and height of a step according to the critical rotation angle $θ_c$. For example, the image processing method provided in at least one embodiment of the present disclosure further includes the following condition. As shown in FIG. 2, the critical rotation angle $θ_c$ is equal to the angle of the plane in which adjacent step edges are located with respect to the horizontal plane (that is, the imaging plane of the camera is parallel to the plane in which the adjacent step edges are located while the camera is at the critical rotation angle $θ_c$). Therefore, the horizontal distance s (namely the width of the step) and vertical distance h (namely the height of the step) between adjacent step edges are calculated according to the critical rotation angle $θ_c$, in which s=d*cos $θ_c$, h=d*sin $θ_c$. In FIG. 2, C denotes the coinciding optical centers of the left pick-up head and the right pick-up head of the camera, the fold line denotes the steps of the stair, and the rotation angle $θ_c$ of the camera with respect to the horizontal plane is equal to the angle between the plane in which the adjacent straight line edges Ed are located and the horizontal plane.

For example, the image processing method provided in at least one embodiment of the present disclosure further includes: before acquiring the 2D depth array $D_p$, acquiring a left image and a right image including the target object with the left pick-up head and the right pick-up head of the camera respectively; comparing at least one of the left image and the right image with the reference image stored in an image library to determine whether the target object in the at least one of the left image and the right image includes a straight line edge.

For example, the image processing method provided in at least one embodiment of the present disclosure further includes: after determining that the target object in the at least one of the left image and the right image includes the straight line edge, acquiring a plurality of sets of corresponding pixel points (e.g. at least three sets of corresponding pixel points) according to the left image and the right image, in which each set of corresponding pixel points include a left pixel point in left image and a right pixel point in right image which are corresponding to the same object point in the target object; then comparing the magnitudes of ordinates of the left pixel point and the right pixel point of each set of corresponding pixel points to determine whether the straight line edge of the target object is parallel to the line connecting the optical centers of the left pick-up head and the right pick-up head.

Figure 3:
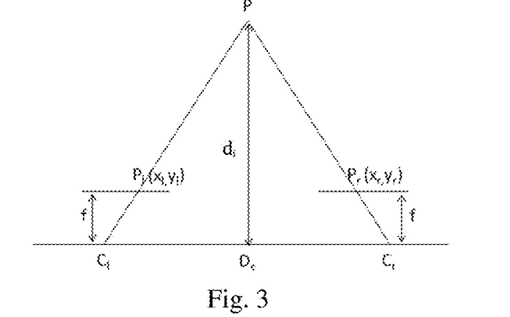
FIG. 3 is a schematic diagram of a triangulation principle applied in the image processing method according to the embodiments of the present disclosure.

FIG. 3 is a diagram of the triangulation principle applied in the image processing method according to an embodiment of the present disclosure. For example, as shown in FIG. 3, $C_l$ denotes the optical center of the left pick-up head; $C_r$ denotes the optical center of the right pick-up head; $D_c$ denotes the distance between optical centers of the left pick-up head and the right pick-up head; f denotes the focal length of the left pick-up head and the right pick-up head (equal for both); P denotes an object point of the straight line edge; $P_l$ and $P_r$ are imaging points of the object point P on the focal length plane of the camera and constitute a set of corresponding pixel points, $(x_l, y_l)$ and $(x_r, y_r)$ are coordinate points representing locations of imaging points Pi and $P_r$ in corresponding images respectively; $d_i$ denotes the distance from the object point P to the line connecting the optical centers $C_lC_r$ of the left pick-up head and the right pick-up head, $d_i=fD_c/d_x$, $d_x=|x_l-x_r|$.

For example, in a situation where the ordinate of the left pixel point equals the ordinate of the right pixel point for the corresponding pixel points, namely $y_l=y_r$, it is determined that the straight line edge is parallel to the line connecting the optical centers $C_lC_r$ of the left pick-up head and the right pick-up head; in a situation where the ordinate of the left pixel point is greater than the ordinate of the right pixel point for the corresponding pixel points, namely $y_l>y_r$, it is determined that the distance from the optical center $C_l$ of the left pick-up head to the straight line edge is greater than the distance from the optical center $C_r$ of the right pick-up head to the straight line edge; and in a situation where the ordinate of the left pixel point is smaller than the ordinate of the right pixel point for the corresponding pixel points, namely $y_l<y_r$, it is determined that the distance from the optical center $C_l$ of the left pick-up head to the straight line edge is smaller than the distance from the optical center $C_r$ of the right pick-up head to the straight line edge.

For example, the image processing method provided in at least one embodiment of the present disclosure further includes: in a situation where the straight line edge is parallel to the line connecting the optical centers $C_lC_r$, obtaining a parallax array $D_x$ with the left image and the right image, in which each element $d_x$ in the parallax array $D_x$ has a value being the absolute value of difference between abscissas of the left pixel point and the right pixel point for the corresponding pixel points of the corresponding set, namely $d_x=|x_1-x_r|$; and obtaining the 2D depth array $D_p$ with a formula $d_i=fD_c/d_x$ according to the parallax array $D_x$, the focal length f of the left pick-up head and the right pick-up head and the distance $D_c$ between optical centers of the left pick-up head and the right pick-up head.

For example, the left image captured by the left pick-up head may be expressed with an array $R_l$, and the right image captured by the right pick-up head may be expressed with an array $R_r$, $R_l=[l_{11}, l_{12}, l_{13}, \ldots ; l_{21}, l_{22}, l_{23}, \ldots ; \ldots ; \ldots l_{n1}, l_{n2}, l_{n3}, \ldots]$, $R_r=[r_{11}, r_{12}, r_{13}, \ldots ; r_{21}, r_{22}, r_{23}, \ldots ; \ldots ; \ldots r_{n1}, r_{n2}, r_{n3}, \ldots]$, in which values of elements in $R_l$ and $R_r$ are gray values; and in a situation where the straight line edge is parallel to the line connecting the optical centers of the left pick-up head and the right pick-up head, pixel points corresponding to the same object point are extracted by matching elements in $R_l$ and $R_r$, and the parallax array $D_x$ is obtained according to the formula $d_x=|x_l-x_r|$.

Figure 4:
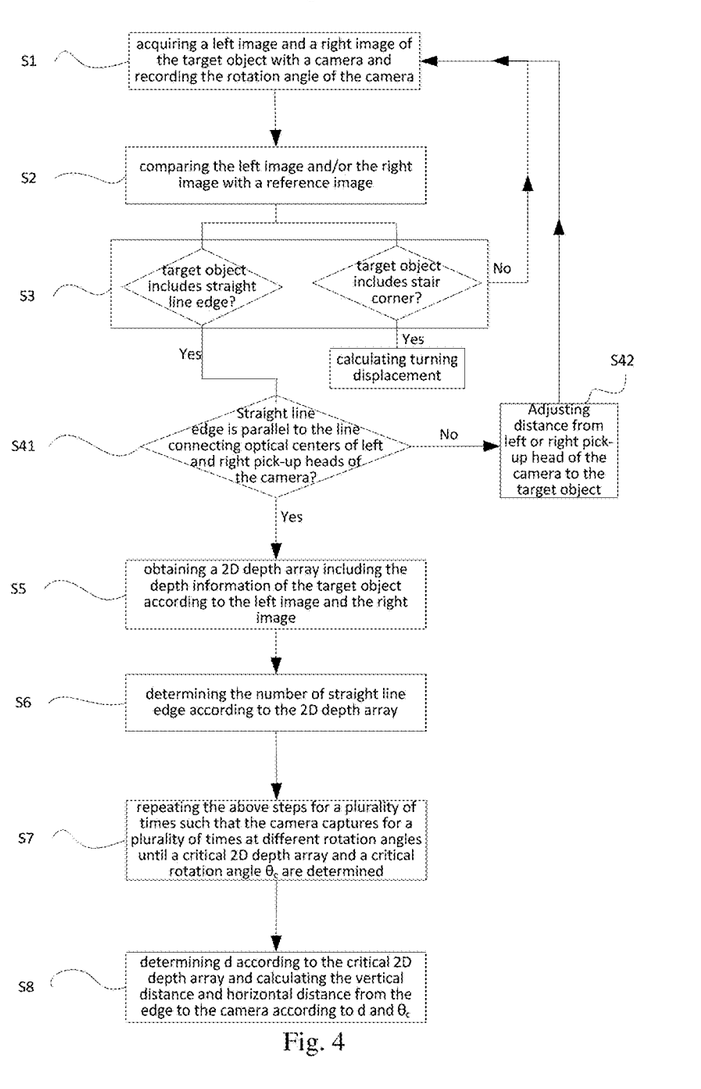
FIG. 4 is another flow chart of the image processing method provided in the embodiments of the present disclosure.

The image processing method provided in the embodiments of the present disclosure will be described below with respect to an example in which the embodiments of the present disclosure are applied to identify a stair and with reference to FIG. 4. For example, the image processing method includes the following steps S1 to S8.

Step S1: acquiring a left image and a right image of the target object with a camera and recording the rotation angle of the camera.

Step S2: comparing at least one of the left image and the right image with the reference image stored in an image library.

Step S3: determining whether the target object includes a straight line edge according to a comparison result to determine whether the target object is a stair. If the comparison result indicates that the target object does not include any straight line edge but includes a stair corner, a turning displacement (or called a direction changing displacement or turning angle) is determined; and if the comparison result indicates that neither straight line edge nor stair corner is included, the flow returns to step S1 for capturing front environment of the camera.

If the comparison result indicates that the target object includes a straight line edge, the flow proceeds to step S41 of determining whether the straight line edge is parallel to the line connecting the optical centers of the left pick-up head and the right pick-up head of the camera.

If the straight line edge is not parallel to the line connecting the optical centers, the flow proceeds to step S42 of adjusting the distances from the left pick-up head and the right pick-up head of the camera to the target object such that the straight line edge is parallel to the line connecting the optical centers and then proceeds to step S1.

If the straight line edge is parallel to the line connecting the optical centers, the flow proceeds to step S5 of obtaining a 2D depth array including the depth information of the target object.

Step S6: determining the number of straight line edge that may be obtained with the 2D depth array, that is, how many elements in the 2D depth array satisfy the edge location determination condition of $|\Delta d_i-\Delta d_{i+1}|>d_0$ as described in the above step S05.

Step S7: repeating the above steps for a plurality of times such that the camera captures for a plurality of times at different rotation angles until the critical 2D depth array and the critical rotation angle $\theta_c$ are determined. The above related description may be referred to for this step and repetitions will not be described any more.

Step S8: determining the distance d from an edge of step to the camera according to the obtained critical 2D depth array and calculating the width and height of each step of the stair according to d and the critical rotation angle $\theta_c$.

Figure 5:
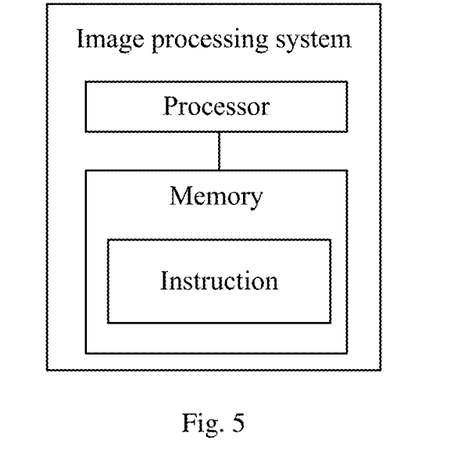
FIG. 5 is a schematic structure diagram of the image processing system according to the embodiments of the present disclosure.

At least one embodiment of the present disclosure further provides an image processing system as shown in FIG. 5, and the image processing system includes a processor and a memory for storing an executable instruction that leads to the processor to carry out the following steps while being loaded by the processor: obtaining a 2D depth array $D_p$ including the depth information of a target object, in which an element $d_{ij}$ is the element of the $i^{th}$ row and the $j^{th}$ column in the 2D depth array $D_p$ and the value of $d_{ij}$ is a depth value; calculating the average value of elements of each row in the 2D depth array $D_p$ to obtain a depth vector $D=[d_1, d_2, d_3, \ldots, d_i, \ldots, d_n]$, in which an element $d_i$ is the average value of elements of the $i^{th}$ row in the 2D depth array $D_p$; calculating absolute values of differences between adjacent elements in the depth vector D to obtain an edge determination vector $\Delta D=[\Delta d_1, \Delta d_2, \Delta d_3, \ldots, \Delta d_i, \ldots, \Delta d_{n-1}]$, in which an element $\Delta d_i=|d_i-d_{i+1}|$; calculating an average value $d_0$ of absolute values of differences between adjacent elements in the edge determination vector $\Delta D$, with $d_0=(|\Delta d_2-\Delta d_1|+|\Delta d_3-\Delta d_2|+ \ldots +|\Delta d_{n-1}-\Delta d_{n-2}|)/(n-2)$; and comparing an absolute value $|\Delta d_i-\Delta d_{i+1}|$ of differences between adjacent elements in the edge determination vector $\Delta D$ with $d_0$ to identify an edge of the target object, in which in a situation where $|\Delta d_i-\Delta d_{i+1}|$ is greater than $d_0$, it is determined that the elements of the $i^{th}$ row in the 2D depth array $D_p$ correspond to the edge of the target object.

For example, the instruction stored in the memory, upon being loaded by the processor, may further execute: determining the distance $d_i$ from the straight line edge to the camera, determining a critical 2D depth array $D_p$, determining a critical rotation angle, determining both a horizontal distance and a vertical distance from the straight line edge to the camera, or determining whether the straight line edge is parallel to the camera, etc. Relevant descriptions of embodiments of the above image processing method may be referred to for implementations of these steps and repetitions will not be described any more.

For example, the memory may be a semiconductor memory, a magnetic surface memory, a laser memory, a random access memory, a read-only memory, a serial access memory, a volatile memory, a non-volatile memory or memories of any other forms known by one skilled in the art.

For example, the processor may be a general purpose process, a digital signal processor (DSP), an application specific integrated circuit (ASIC), a field programmable gate array (FPGA) or other programmable logic devices, discrete gates or transistor logic devices, discrete hardware components. The general-purpose processor may be a microprocessor or any conventional processor.

At least one embodiment of the present disclosure further provides a storage medium with an instruction stored therein that is to be loaded by a processor and to execute: obtaining a 2D depth array $D_p$ including the depth information of a target object, in which an element $d_{ij}$ is the element of the $i^{th}$ row and the $j^{th}$ column in the 2D depth array $D_p$ and the value of $d_{ij}$ is a depth value; calculating the average value of each row of elements in the 2D depth array $D_p$ to obtain a depth vector $D=[d_1, d_2, d_3, \ldots, d_i, \ldots, d_n]$, in which an element $d_i$ is the average value of the $i^{th}$ row of elements in the 2D depth array $D_p$; calculating absolute values of differences between adjacent elements in the depth vector D to obtain an edge determination vector $\Delta D=[\Delta d_1, \Delta d_2, \Delta d_3, \ldots, \Delta d_i, \ldots, \Delta d_{n-1}]$, in which an element $\Delta d_i=|d_i-d_{i+1}|$; calculating the average value $d_0$ of absolute values of differences between adjacent elements in the edge determination vector $\Delta D$, with $d_0=(|\Delta d_2-\Delta d_1|+|\Delta d_3-\Delta d_2|+ \ldots +|\Delta d_{n-1}-\Delta d_{n-2}|)/(n-2)$; and comparing an absolute value $|\Delta d_i-\Delta d_{i+1}|$ of differences between adjacent elements in the edge determination vector $\Delta D$ with $d_0$ to identify an edge of the target object, in which in a situation where $|\Delta d_i-\Delta d_{i+1}|$ is greater than $d_0$, it is determined the $i^{th}$ row of elements in the 2D depth array $D_p$ correspond to the edge of the target object.

For example, the instruction stored in the storage medium, upon being loaded by the processor, may further execute: determining the distance $d_i$ from the straight line edge to the camera, determining the critical 2D depth array $D_p$, determining the critical rotation angle, determining the horizontal distance and vertical distance from the straight line edge to the camera, or determining whether the straight line edge is parallel to the camera, etc. Relevant descriptions of embodiments of the above image processing method may be referred to for implementations of these steps and repetitions will not be described any more.

For example, the storage medium may be a semiconductor memory, a magnetic surface memory, a laser memory, a random access memory, a read-only memory, a serial access memory, a volatile memory, a non-volatile memory or storage medium of any other forms known by one skilled in the art.

For example, the processor may be a general purpose process, a digital signal processor (DSP), an application specific integrated circuit (ASIC), a field programmable gate array (FPGA) or other programmable logic devices, discrete gates or transistor logic devices, discrete hardware components. The general-purpose processor may be a microprocessor or any conventional processor.

The moving system provided in embodiments of the present disclosure will be described in detail below with respect to identifying a stair as an example and with reference to FIGS. 6, 7a and 7b.

Figure 6:
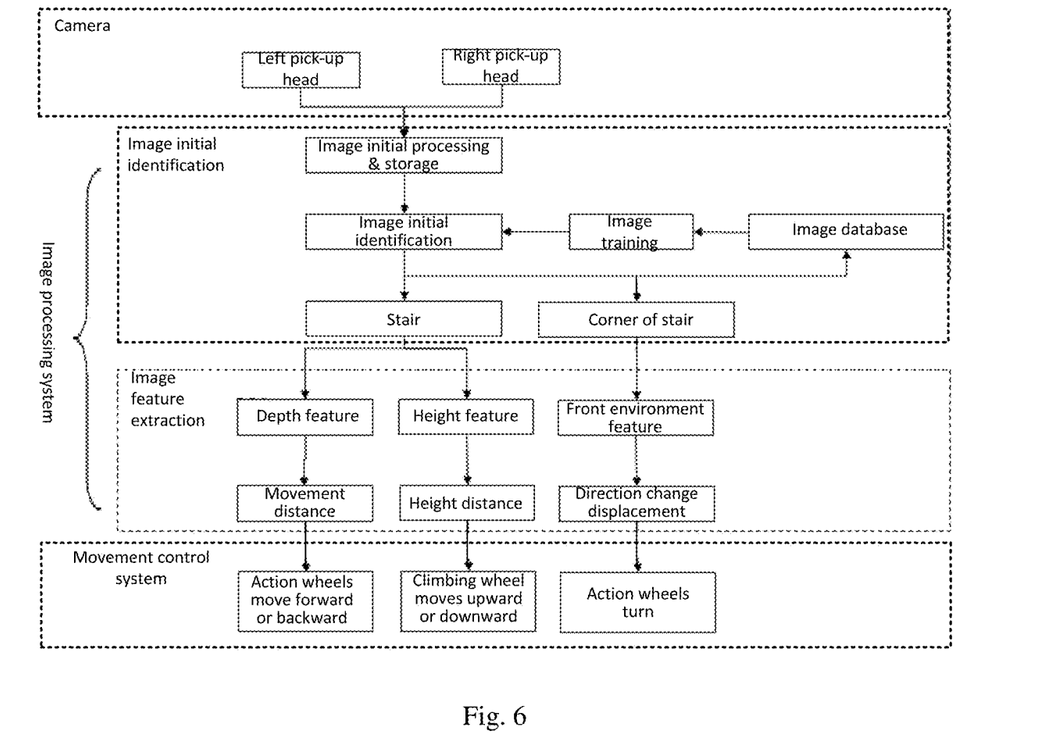
FIG. 6 is a structure block diagram of a moving system according to the embodiments of the present disclosure.

For example, as shown in FIG. 6, at least one embodiment of the present disclosure provides a moving system including a camera, the image processing system as described in any of the above embodiments and a movement control system.

The camera includes a left pick-up head and a right pick-up head for capturing front environment such as a stair, or a corner of the stair or other front environment to obtain a left image and a right image of the front environment.

The image processing system is configured to process images acquired by the camera, including for example initial identification and feature extraction of the left image and the right image captured by the camera.

The initial identification of image by the image processing system includes: subjecting the acquired images to initial processing such as noise reduction and then storing them, followed by initially identifying them. For example, by comparing the acquired images with a reference image to determine whether the acquired images include a stair or a corner of the stair, thereby the initial identification is realized. In some embodiments, it is also possible to store the images after initial identification in an image database (image library) for image training to further optimize image identification rate.

The image feature extraction function of the image processing system includes: (1) extracting the horizontal distance from the straight line edge of the target object to the camera such as the depth feature of the stair, namely the width of a single step of the stair to determine the movement distance (i.e. distance for forward or backward movement) of the moving system; (2) extracting the vertical distance from the straight line edge of the target object to the camera such as the height feature of the stair, namely the height of a single step of the stair to determine the height distance (i.e. distance for upward or downward movement) of the moving system; and (3) extracting an environmental feature in front of the corner of the stair by image training and machine learning to determine the direction change displacement (namely turning displacement or turning angle) of the moving system.

The movement control system is configured to control the moving system in terms of movement according to the processing result of the image processing system (for example, features extracted by the image processing system). For example, the movement control system is configured to: (1) control the action wheels of the moving system (e.g. including a drive moving wheel and a driven moving wheel) to move forward or backward according to the movement distance; (2) control the climbing wheel to move upward or downward according to the height distance; (3) control the action wheels to change direction (namely to turn) according to the direction change displacement; and (4) brake the action wheels. For example, in a situation where the processing result of the image processing system is that the target object includes a straight line edge (e.g. the target object is a stair), the movement control system controls the moving system to implement at least functions described in (1) and (2); and in a situation where the processing result of the image processing system is that the target object is a corner of a stair, the movement control system controls the moving system to implement at least the function as described in (3).

As can be seen from FIG. 6, the moving system in the embodiment of the present disclosure can automatically identify the environment in front of the moving system with the camera and the image processing system and automatically acquire the step width and height of the step of the stair in the front environment, and may automatically adjust the moving step size, the climbing height or turning angle to move automatically with the movement control system, thereby moving intelligently without any manual assistance for different scenarios, different step widths and different heights.

Figure 7A:
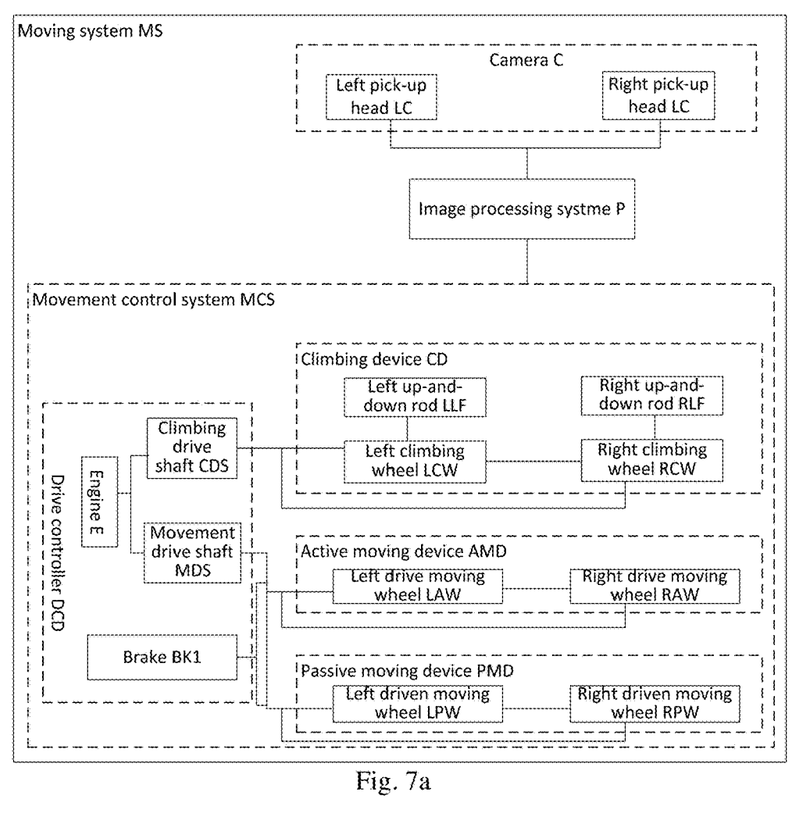
FIG. 7a is another structure block diagram of the moving system according to the embodiments of the present disclosure.
Figure 7B:
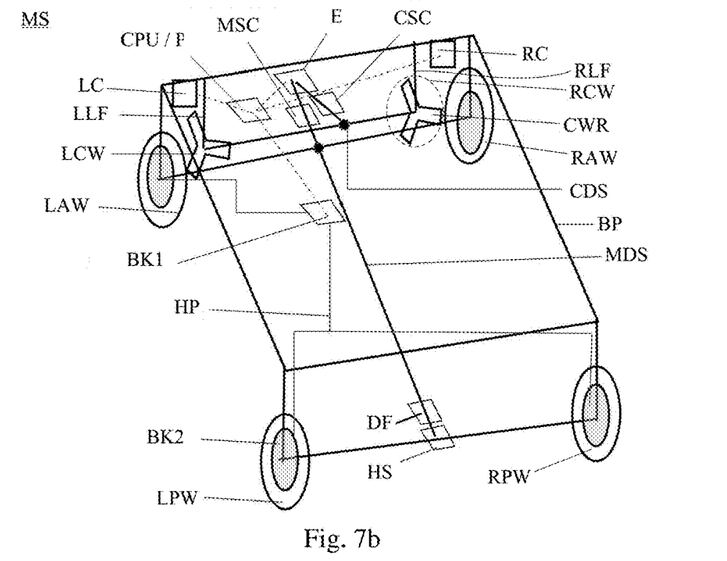
FIG. 7b is a schematic structure diagram of the moving system according to the embodiments of the present disclosure.

For example, as shown in FIGS. 7a and 7b, at least one embodiment of the present disclosure provides a moving system MS including a camera C, an image processing system P and a movement control system MCS. The camera C includes a left pick-up head LC and a right pick-up head RC, is connected with the image processing system P and is configured to output image signals to the image processing system P. The image processing system P may identify the front environment according to the image signals output by the camera C, for example, the depth information (namely the width of step of a stair), height distance and direction change displacement of a stair. The movement control system MCS includes: an active moving device AMD configured to move the moving system MS; a passive moving device PMD connected with the active moving device AMD and configured to move under the driving of the active moving device AMD; a climbing device CD configured to drive the moving system MS to implement a climbing function; and a drive controller DCD connected with the image processing system P and configured to control the actions of the active moving device AMD and the climbing device CD according to the processing result of the image processing system P. The drive controller DCD may control the active moving device AMD to implement functions of automatically adjusting step size, automatically moving or turning according to the processing result of the image processing system P and may further control the climbing device CD to implement the climbing function according to the processing result of the image processing system P.

It is to be noted that the climbing function of the moving system mentioned in embodiments of the present disclosure is not only for climbing a stair, but may be applicable to any object that has a step-like structure.

For example, the movement control system MCS further includes a base plate BP in front of which the camera C (see LC and RC) is located to capture front environment while the moving system MS moves. Both the active moving device AMD and the passive moving device PMD and the climbing device CD are located below the base plate BP to drive the base plate to implement functions of moving forward and backward, turning and climbing. Above the base plate BP, heavy objects or disabled or the old may be carried.

For example, the drive controller DCD includes a movement drive shaft MDS, a climbing drive shaft, an engine and a brake BK1. The engine E is configured to drive the active moving device AMD via the movement drive shaft MDS and drive the climbing device CD via the climbing drive shaft CDS, and the engine E is configured to control the active moving device AMD and the climbing device CD according to the processing result of the image processing system P. The brake BK1 is configured to control the active moving device AMD and the passive moving device PMD according to the processing result of the image processing system P.

For example, the movement drive shaft MDS is connected with the engine E via a movement speed changer MSC and transfers the power of the engine E to the active moving device AMD. For example, the climbing drive shaft CDS is connected with the engine E via a climbing speed changer CSC and transfers the power of the engine E to the climbing device CD.

For example, the brake BK1 is connected with the active moving device AMD and the passive moving device PMD via a hydraulic pipeline HP or other types of transmission system.

For example, the drive controller DCD may further include another brake BK2 connected with the passive moving device PMD. For example, the brake BK2 is a brake drum or other types of brakes.

For example, the left pick-up head LC and the right pick-up head RC included in the camera C are both CCD (charge-coupled device) cameras or other types of the cameras.

For example, the climbing device CD includes a climbing wheel including a plurality of, e.g., 3 or more rod-like structures CWR, which extend radially and outwardly from the center of the climbing wheel. In the climbing process, the rod-like structures CWR act on the step of the stair and rotate accordingly by rotating the climbing wheel, thereby driving the moving system MS to span the step, realizing climbing the stair. For example, the climbing wheel includes three rod-like structures CWR that equally divides the circumference. The rod-like structures CWR may be rods of any rigid material.

For example, the climbing device CD includes a left climbing wheel LCW and a right climbing wheel RCW (for example, the left and right climbing wheels include rod-like structures with the same length) and the alignment direction of the two climbing wheels is the same as the alignment direction of the left pick-up head LC and the right pick-up head RC (for example, the line connecting centers of the left climbing wheel and the right climbing wheel is parallel to the line connecting the optical centers of the left pick-up head and the right pick-up head). Using two climbing wheels is in favor of keeping the moving system MS stable while climbing. For example, one of the left climbing wheel LCW and the right climbing wheel RCW is a drive climbing wheel and the other one is a driven climbing wheel. The drive climbing wheel may flip forward to climb under the control of the engine E.

For example, the climbing device CD further includes an up-and-down rod that can rise or fall and is connected with the base plate and the climbing wheel for realizing the rising and falling of the climbing wheel, thereby making the moving system applicable to steps of different heights. For example, the up-and-down rod is connected with the engine E and configured to rise or fall under the control of the engine E. For example, the climbing device CD includes a left up-and-down rod LLF connected with the left climbing wheel LCW and a right up-and-down rod RLF connected with the right climbing wheel RCW.

For example, the active moving device AMD includes two drive moving wheels, i.e., a left drive moving wheel LAW and a right drive moving wheel RAW, for implementing forward, backward, left and right movement of the moving system. These two drive moving wheels are both provided after the climbing wheel to prevent the drive moving wheels from contacting the stair and influencing climbing of the climbing wheel. For example, it is possible to implement turning or moving straightforward by controlling movement of the left and right moving wheels according to the processing result of the image processing system P. For example, in a situation where the processing result of the image processing system P is that the ordinates of the left pixel point and the right pixel point in corresponding pixel points are not equal, namely $y_l \neq y_r$, in FIG. 3, it is possible to turn by controlling the left drive moving wheel and the right drive moving wheel; if $y_l > y_r$, it is possible to realize $y_l = y_r$ by controlling the left drive moving wheel LAW to move forward; and if $y_l < y_r$, it is possible to realize $y_l = y_r$ by controlling the right drive moving wheel RAW to move forward. Using two drive moving wheels facilitates controlling forward and backward movement and turning movement of the moving system MS and facilitates smooth movement of the moving system MS.

For example, the active moving device AMD includes two drive moving wheels with equal diameters and the line connecting centers of the two drive moving wheels is parallel to the line connecting the optical centers of the left pick-up head LC and the right pick-up head RC of the camera. In embodiments of the present disclosure, it is possible to determine whether the edge of step is parallel to the line connecting the optical centers of the pick-up head and the right pick-up head by comparing that, for the same object point of the stair step edge, whether ordinates of the left pixel point of in the left image acquired by the left pick-up head and the right pixel point in the right image acquired by the right pick-up head; and in a situation where these two are not parallel to each other, setting diameters of the two drive moving wheels to be equal facilitates making the edge of step to be parallel to the line connecting the optical centers by moving the left drive moving wheel LAW or the right drive moving wheel RAW.

For example, the passive moving device PMD includes a driven moving wheel located behind the drive moving wheel, a half shaft HS and a differential mechanism DF in which the differential mechanism DF is connected with the movement drive shaft MDS and the half shaft HS connects the driven moving wheel PW with the differential mechanism DE The differential mechanism DF is configured to allow the drive moving wheel and the driven moving wheel to rotate at different speeds. The half shaft HS is configured to transfer power between the differential mechanism DF and the driven moving wheel. For example, the passive moving device PMD includes a left driven moving wheel LPW and a right driven moving wheel RPW aligned in the alignment direction of the left pick-up head LC and the right pick-up head RC to facilitate keeping the moving system MS stable.

At least another embodiment of the present disclosure provides a moving system applicable to the image processing system P which is similar to the moving system MS as shown in FIG. 7a with the main difference of excluding the image processing system P. The moving system includes a camera and a movement control system. As shown in FIG. 7a, the camera includes a left pick-up head LC and a right pick-up head RC and is configured to output image signals to the image processing system P. The movement control system includes: an active moving device configured to move the moving system MS according to the processing result of the image processing system P; a passive moving device connected with the active moving device and configured to move under the driving of the active moving device; a climbing device configured to drive the moving system MS to implement a climbing function and including a climbing wheel (which includes a left climbing wheel LCW and a right climbing wheel RCW, for example), which includes a plurality of rod-like structures CWR extending radially and outwardly from the center of the climbing wheel; and a drive controller configured to control the actions of the active moving device and the climbing device according to the processing result of the image processing system.

For example, the drive controller includes a central processing unit CPU, a movement drive shaft MDS, a climbing drive shaft, an engine and a brake BK1. The engine E is configured to drive the active moving device via the movement drive shaft MDS and drive the climbing device via the climbing drive shaft CDS, and the engine E is configured to control the active moving device and the climbing device according to the instruction of the central processing unit CPU. The brake BK1 is configured to control braking of the active moving device and the passive moving device according to the instruction of the central processing unit CPU. For example, when the moving system adopts the image processing system P, the central processing unit CPU and the image processing system P may be integrated together or may adopt separate devices connected with each other.

For example, the climbing device includes two climbing wheels CW and the alignment direction of the two climbing wheels is the same as the alignment direction of the left pick-up head LC and the right pick-up head RC.

For example, the climbing device further includes an up-and-down rod connected with the climbing wheel.

Relevant descriptions in embodiments of the moving system MS including the image processing system P may be referred to for implementations of components in the moving system applicable to the image processing system P and repetitions will not be described any more.

In summary, the image processing method and system provided in embodiments of the present disclosure may be used to automatically identify step-like structures such as a stair. The moving system in the embodiments of the present disclosure can automatically identify the environment in front of the moving system with the camera and the image processing system and automatically acquire the width and height of step of the stair in the front environment, and may automatically adjust the moving step size, the climbing height or turning angle to move automatically with the movement control system, thereby realizing to move intelligently without any manual assistance for different scenarios, different step widths and different heights.

What are described above is related to the illustrative embodiments of the disclosure only and not limitative to the scope of the disclosure; the scopes of the disclosure are defined by the accompanying claims.

This application claims the benefit of Chinese patent application No. 201710554504.1 filed on Jun. 30, 2017, which is hereby entirely incorporated by reference as a part of the present application.

What is claimed is:

1. An image processing method comprising:
   obtaining a 2D (two-dimensional) depth array $D_p$ having depth information of a target object, wherein an element $d_{ij}$ is an element of an $i^{th}$ row and $j^{th}$ column in the 2D depth array $D_p$ and a value of the element $d_{ij}$ is a depth value;
   calculating an average value of elements in each row in the 2D depth array $D_p$ to obtain a depth vector $D=[d_1, d_2, d_3, d_i, \ldots, d_n]$, wherein an element $d_i$ is an average value of elements of the $i^{th}$ row in the 2D depth array;
   calculating an absolute value of differences between adjacent elements in the depth vector D to obtain an edge determination vector $\Delta D=[\Delta d_1, \Delta d_2, \Delta d_3, \Delta d_i, \ldots, \Delta d_{n-1}]$, wherein an element $\Delta d_i=|d_i-d_{i+1}|$;
   calculating an average value $d_0$ of absolute values of differences between adjacent elements in the edge determination vector $\Delta D$, wherein $d_0=(|\Delta d_2-\Delta d_1|+|\Delta d_3-\Delta d_2|+ \ldots +|\Delta d_{n-1}-\Delta d_{n-2}|)/(n-2)$; and
   comparing an absolute value $|\Delta d_i-\Delta d_{i+1}|$ of differences between adjacent elements in the edge determination vector $\Delta D$ with $d_0$ to identify an edge of the target object, wherein in a situation where $|\Delta d_i-\Delta d_{i+1}|$ is greater than $d_0$, it is determined that the elements of the $i^{th}$ row in the 2D depth array $D_p$ correspond to the edge of the target object.

2. The image processing method of claim 1, wherein in the situation where $|\Delta d_i-\Delta d_{i+1}|$ is greater than $d_0$, a value of $d_i$ in the depth vector D is determined as a distance d from the edge to a line connecting optical centers of a left pick-up head and a right pick-up head that a camera for obtaining the depth information of the target object comprises.

3. The image processing method of claim 2, further comprising:
determining a horizontal distance from the edge to the line connecting the optical centers and a vertical distance from the edge to the line connecting the optical centers according to a rotation angle θ of the camera with respect to a horizontal plane while acquiring a left image and a right image which are used for obtaining the 2D depth array and according to the distance d from the edge to the line connecting the optical centers.

4. The image processing method of claim 1, further comprising:
step A of capturing the target object with a camera at different rotation angles with respect to a horizontal plane to obtain a plurality of sets of left images and right images;
step B of obtaining a plurality of 2D depth arrays according to the plurality of sets of left images and right images;
step C of determining a number of edges corresponding to each 2D depth array;
step D of determining rotation angles $θ_0$ and $θ_1$ of the camera with respect to the horizontal plane that the 2D depth arrays respectively corresponding to 0 edge and 1 edge correspond to, respectively; and
repeating steps A to C within an angle range of $θ_0$ to $θ_1$ to determine a critical rotation angle $θ_c$ of the camera with respect to the horizontal plane, wherein the critical rotation angle $θ_c$ refers to a rotation angle corresponding to the 2D depth array which corresponds to 1 edge and serves as a critical change point while the number of edges corresponding to the 2D depth array changes between 0 and 1.

5. The image processing method of claim 4, further comprising:
calculating a horizontal distance and a vertical distance between adjacent edges according to the critical rotation angle $θ_c$.

6. The image processing method of claim 1, further comprising:
before obtaining the 2D depth array $D_p$, obtaining a left image and a right image which comprise the target object with a left pick-up head and a right pick-up head of a camera respectively; and
comparing at least one of the left image and the right image with a reference image to determine whether the target object in the at least one of the left image and the right image comprises a straight line edge.

7. The image processing method of claim 6, further comprising:
after determining that the target object in the at least one of the left image and the right image comprises the straight line edge, acquiring a plurality of sets of corresponding pixel points from the left image and the right image, wherein each set of corresponding pixel points comprises a left pixel point in the left image and a right pixel point in the right image which correspond to a same object point of the target object; and
comparing magnitudes of ordinates of the left pixel point and the right pixel point of each set of corresponding pixel points to determine whether the straight line edge of the target object is parallel to a line connecting optical centers of the left pick-up head and the right pick-up head.

8. The image processing method of claim 7, wherein
in a situation where the ordinate of the left pixel point equals to the ordinate of the right pixel point for the set of corresponding pixel points, it is determined that the straight line edge is parallel to the line connecting the optical centers of the left pick-up head and the right pick-up head;
in a situation where the ordinate of the left pixel point is greater than the ordinate of the right pixel point for the set of corresponding pixel points, it is determined that a distance from the optical center of the left pick-up head to the straight line edge is greater than a distance from the optical center of the right pick-up head to the straight line edge; and
in a situation where the ordinate of the left pixel point is smaller than the ordinate of the right pixel point for the set of corresponding pixel points, it is determined that the distance from the optical center of the left pick-up head to the straight line edge is smaller than the distance from the optical center of the right pick-up head to the straight line edge.

9. The image processing method of claim 7, further comprising:
in a situation where the straight line edge is parallel to the line connecting the optical centers, obtaining a parallax array $D_x$ by utilizing the left image and the right image, wherein a value of each element of the parallax array $D_x$ is an absolute value of a difference between abscissas of a left pixel point and a right pixel point which are in a set of corresponding pixel points that the each element corresponds to; and
obtaining the 2D depth array $D_p$ according to the parallax array $D_x$, a focal length f of the left pick-up head and the right pick-up head and a distance $D_c$ between the optical centers of the left pick-up head and the right pick-up head.

10. An image processing system comprising:
a processor; and
a memory for storing an executable instruction that is loaded by the processor to execute:
obtaining a 2D depth array $D_p$ having depth information of a target object, wherein an element $d_{ij}$ is an element of an $i^{th}$ row and $j^{th}$ column in the 2D depth array $D_p$ and a value of the element $d_{ij}$ is a depth value;
calculating an average value of elements in each row in the 2D depth array $D_p$ to obtain a depth vector $D=[d_1, d_2, d_3, d_i, \ldots, d_n]$, wherein an element $d_i$ is an average value of elements of the $i^{th}$ row in the 2D depth array;
calculating an absolute value of differences between adjacent elements in the depth vector D to obtain an edge determination vector $\Delta D=[\Delta d_1, \Delta d_2, \Delta d_3, \Delta d_i, \ldots, \Delta d_{n-1}]$, wherein an element $\Delta d_i=|d_i-d_{i+1}|$;
calculating an average value $d_0$ of absolute values of differences between adjacent elements in the edge determination vector $\Delta D$, wherein $d_0=(|\Delta d_2-\Delta d_1|+|\Delta d_3-\Delta d_2|+ \ldots +|\Delta d_{n-1}-\Delta d_{n-2}|)/(n-2)$; and
comparing an absolute value $|\Delta d_i-\Delta d_{i+1}|$ of differences between adjacent elements in the edge determination vector $\Delta D$ with $d_0$ to identify an edge of the target object, wherein in a situation where $|\Delta d_i-\Delta d_{i+1}|$ is greater than $d_0$, it is determined that the elements of the $i^{th}$ row in the 2D depth array $D_p$ correspond to the edge of the target object.

11. The image processing system of claim 10, interfaced with a moving system, the moving system further comprising:

a camera comprising a left pick-up head and a right pick-up head and being configured to output image signals to the image processing system; and a movement control system comprising:
an active moving device configured to move the moving system;
a passive moving device connected with the active moving device and configured to move under drive of the active moving device;
a climbing device configured to drive the moving system to implement a climbing function; and
a drive controller configured to control actions of the active moving device and the climbing device according to a processing result of the image processing system.

12. The image processing system of claim 11, wherein the climbing device comprises a climbing wheel which comprises a plurality of rod-like structures extending radially and outwardly from a center of the climbing wheel.

13. The image processing system of claim 12, wherein the climbing device further comprises an up-and-down rod connected with the climbing wheel.

14. The image processing system of claim 11, wherein the active moving device comprises two drive moving wheels with equal diameters, and a line connecting centers of the two drive moving elements is parallel to a line connecting optical centers of the left pick-up head and the right pick-up head of the camera.

15. The image processing system of claim 11, wherein the drive controller comprises a movement drive shaft, a climbing drive shaft, an engine and a brake, the engine is configured to drive the active moving device via the movement drive shaft and drive the climbing device via the climbing drive shaft, and the brake is configured to control braking of the active moving device and the passive moving device.

16. The image processing system of claim 15, wherein the passive moving device comprises a driven moving wheel, a half shaft and a differential mechanism, the differential mechanism is connected with the movement drive shaft, and the half shaft connects the driven moving wheel with the differential mechanism.

17. The image processing system of claim 11, wherein the movement control system further comprises a base plate, the camera is at a front end of the base plate, the active moving device, the passive moving device and the climbing device are below the base plate.

18. The image processing system of claim 11, wherein the climbing device comprises a climbing wheel which comprises a plurality of rod-like structures extending radially and outwardly from a center of the climbing wheel.

19. A non-transitory storage medium with an instruction stored therein, wherein the instruction is configured to be loaded by a processor to execute:
obtaining a 2D depth array $D_p$ having depth information of a target object, wherein an element $d_{ij}$ is an element of an $i^{th}$ row and $j^{th}$ column in the 2D depth array $D_p$ and a value of the element $d_{ij}$ is a depth value;
calculating an average value of elements in each row in the 2D depth array $D_p$ to obtain a depth vector $D=[d_1, d_2, d_3, d_i, \ldots, d_n]$, wherein an element $d_i$ is an average value of elements of the $i^{th}$ row in the 2D depth array;
calculating an absolute value of differences between adjacent elements in the depth vector D to obtain an edge determination vector $\Delta D=[\Delta d_1, \Delta d_2, \Delta d_3, \Delta d_i, \ldots, \Delta d_{n-1}]$, wherein an element $\Delta d_i=|d_i-d_{i+1}|$;
calculating an average value $d_0$ of absolute values of differences between adjacent elements in the edge determination vector $\Delta D$, wherein $d_0=(|\Delta d_2-\Delta d_1|+|\Delta d_3-\Delta d_2|+ \ldots +|\Delta d_{n-1}-\Delta d_{n-2}|)/(n-2)$; and
comparing an absolute value $|\Delta d_i-\Delta d_{i+1}|$ of differences between adjacent elements in the edge determination vector $\Delta D$ with $d_0$ to identify an edge of the target object, wherein in a situation where $|\Delta d_i-\Delta d_{i+1}|$ is greater than $d_0$, it is determined that the elements of the $i^{th}$ row in the 2D depth array $D_p$ correspond to the edge of the target object.

* * * * *